United States Patent
Lee et al.

(10) Patent No.: US 10,024,279 B2
(45) Date of Patent: Jul. 17, 2018

(54) APPARATUS FOR IMPROVING COOLING EFFICIENCY OF ENGINE ROOM IN VEHICLE

(71) Applicant: Hyundai Motor Company, Seoul (KR)

(72) Inventors: Jin Kwan Lee, Anyang-si (KR); Dang Hee Park, Seoul (KR); Yong Beom Park, Gunpo-si (KR); Jang Sup Na, Suwon-si (KR); Seong Dae Cha, Busan (KR); Seng Joo Yang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 109 days.

(21) Appl. No.: 14/949,621

(22) Filed: Nov. 23, 2015

(65) Prior Publication Data

US 2016/0298580 A1    Oct. 13, 2016

(30) Foreign Application Priority Data

Apr. 8, 2015   (KR) .................. 10-2015-0049565
Sep. 14, 2015  (KR) .................. 10-2015-0129966

(51) Int. Cl.
*F02M 35/10* (2006.01)
*F02M 35/16* (2006.01)
(Continued)

(52) U.S. Cl.
CPC ..... *F02M 35/10268* (2013.01); *B60K 11/085* (2013.01); *B60K 13/02* (2013.01);
(Continued)

(58) Field of Classification Search
CPC . F02M 35/10268; F02M 35/161; F02M 35/02
See application file for complete search history.

(56) References Cited

U.S. PATENT DOCUMENTS

| | | | | |
|---|---|---|---|---|
| 5,350,444 A | * | 9/1994 | Gould | B60H 3/0641 454/158 |
| 6,425,930 B1 | * | 7/2002 | Wake | B01D 46/0095 123/198 E |

(Continued)

FOREIGN PATENT DOCUMENTS

| | | |
|---|---|---|
| JP | 5-33736 A | 2/1993 |
| KR | 1994-0003536 B1 | 12/1990 |

(Continued)

OTHER PUBLICATIONS

Machine translation of JP05-33736A.*

*Primary Examiner* — Long T Tran
(74) *Attorney, Agent, or Firm* — Morgan, Lewis & Bockius LLP

(57) ABSTRACT

An apparatus for improving cooling performance of an engine room in a vehicle, may include an air duct connected to an air cleaner to serve as a moving guide of fresh air; a duct flap installed to open and close some section of the air duct and operated to supply all the fresh air introduced into the air duct when the air duct is in a closed state to the air cleaner and discharge some of the fresh air introduced into the air duct when the air duct is in an opened state to a space of a high temperature part of the engine room; and an actuator supplying power to the duct flap to perform an opening and closing operation of the duct flap.

12 Claims, 6 Drawing Sheets

(51) Int. Cl.
   *F02M 35/108* (2006.01)
   *B60K 11/08* (2006.01)
   *B60K 13/02* (2006.01)

(52) U.S. Cl.
   CPC .... *F02M 35/108* (2013.01); *F02M 35/10013* (2013.01); *F02M 35/10255* (2013.01); *F02M 35/161* (2013.01); *Y02T 10/88* (2013.01)

(56) References Cited

U.S. PATENT DOCUMENTS

| | | | | |
|---|---|---|---|---|
| 6,848,410 B2 * | 2/2005 | Hoffmann | ............ | G10K 11/22 123/184.57 |
| 7,287,503 B2 | 10/2007 | Suzuki | | |

FOREIGN PATENT DOCUMENTS

| | | | |
|---|---|---|---|
| KR | 1997-0001921 A | 1/1997 | |
| KR | 10-2004-0000685 A | 1/2004 | |
| KR | 10-2005-0044025 A | 5/2005 | |
| KR | 10-2007-0109491 A | 11/2007 | |
| KR | 10-2011-0119944 A | 11/2011 | |
| KR | 10-2012-0103145 A | 9/2012 | |

* cited by examiner

APPARATUS FOR IMPROVING COOLING EFFICIENCY OF ENGINE ROOM IN VEHICLE

CROSS REFERENCE TO RELATED APPLICATION

The present application claims priority to Korean Patent Application No. 10-2015-0049565, filed Apr. 8, 2015 and Korean Patent Application No. 10-2015-0129966 filed Sep. 14, 2015, the entire contents of which is incorporated herein for all purposes by this reference.

BACKGROUND OF THE INVENTION

Field of the Invention

The present invention relates to an apparatus for improving cooling efficiency of an engine room in a vehicle, and more particularly, to a technology on an apparatus for improving cooling efficiency of an engine room in a vehicle capable of reducing atmosphere temperature of the engine room by supplying some fresh air among external cold air (hereinafter, referred to as fresh air) introduced into an air duct in response to a vehicle speed to the engine room.

Description of Related Art

Generally, external air introduced into an engine room while a vehicle is driving cools a radiator by passing through the radiator and the air heated after cooling the radiator keeps a temporarily stagnated state at a front side of an engine.

In this case, when the temperature of the engine room excessively rises due to the stagnated hot air, the heated air reflows and is thus introduced into an intake system of the engine through an air cleaner, such that fuel efficiency may be reduced.

Further, the hot air stagnated at the front side of the engine heats an intake port of the engine to reduce volume efficiency of the intake port and retard ignition timing, thereby aggravating fuel efficiency and reducing an output.

As a method for solving the above problem, there is a technology of increasing an area of an opening of traveling wind introduced into the engine room of the vehicle, which leads to a problem of changing a layout of the vehicle and greatly increasing costs.

Further, as the fresh air causes noise of a specific frequency band while passing through an air duct, the intake system may make much noise.

The contents described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for improving cooling performance of an engine room in a vehicle capable of reducing a temperature of the engine room and a temperature of an intake port of an engine by supplying some of fresh air introduced into an air duct in response to a vehicle speed to a high temperature part at a front side of an engine, thereby improving fuel efficiency and an output.

Another object of the present invention is to reduce noise of a specific frequency band occurring while fresh air passes through an air duct to greatly reduce noise of an intake system.

According to an exemplary embodiment of the present invention, there is provided an apparatus for improving cooling performance of an engine room in a vehicle, including: an air duct connected to an air cleaner to serve as a moving guide of fresh air; a duct flap installed to open and close some section of the air duct and operated to supply all the fresh air introduced into the air duct when the air duct is in a closed state to the air cleaner and discharge some of the fresh air introduced into the air duct when the air duct is in an opened state to a space of a high temperature part of the engine room; and an actuator supplying power to the duct flap to perform an opening and closing operation of the duct flap.

The space of the high temperature part of the engine room may be a space of a front side of an engine in which an intake manifold or a turbocharger of the engine is positioned.

The apparatus may further include: a controller controlling an operation of the actuator, in which the controller may control the operation of the actuator using vehicle speed information or the air content information introduced into the engine.

The apparatus may further include: a controller controlling an operation of the actuator, in which the controller may control the operation of the actuator using air content information introduced into the engine.

The apparatus may further include: a screen panel installed to partially screen a passage of the air duct by being positioned within the air duct and reduce noise of a specific frequency band by securing hardness of the air duct.

The actuator may be fixedly installed at an outside of the air duct, the actuator may be coupled with a hinge shaft axially rotated by power of the actuator, and the duct flap may be positioned inside the air duct and have one end coupled with the hinge shaft and the other end rotated to open and close some section of the air duct when the hinge shaft is rotated.

The air duct may include: an inlet into which the fresh air is introduced; an outlet connected to the air cleaner; and a middle discharge port positioned between the inlet and the outlet to be opened and closed by the duct flap.

An edge portion of the middle discharge port may be provided with a plurality of stopper flanges and the stopper flanges may contact the duct flap when the middle discharge port is closed by the duct flap to prevent the duct flap from excessively rotating.

The air duct may include: an inlet side duct provided with the inlet and the middle discharge port; and an outlet side duct provided with the outlet while being connected to the inlet side duct.

The inlet may include a first inlet and a second inlet spaced apart from each other, the first and second inlets may be connected to each other by a connection passage, the middle discharge port may be formed at a position opposite to the first inlet and may be formed at a position opposite to the space of the front side of the engine which is the space of the high temperature part of the engine room, and the outlet side duct may be connected to the second inlet to be opposite thereto.

The screen panel may be installed to cut off a portion of the connection passage at a position at which the second inlet is connected to the connection passage.

The duct flap may be operated to open the middle discharge portion only when the vehicle is in an idle state or when a vehicle speed is in a low speed section or a high speed section and close the middle discharge port when the vehicle speed is in a middle section or an acceleration section, the connection passage may be cut off by the duct flap when the duct flap is operated to open the middle discharge port and if the connection passage is cut off by the duct flap, the fresh air introduced into the second inlet may be supplied to the air cleaner through the outlet at the same time the fresh air introduced into the first inlet is discharged to the middle discharge port.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
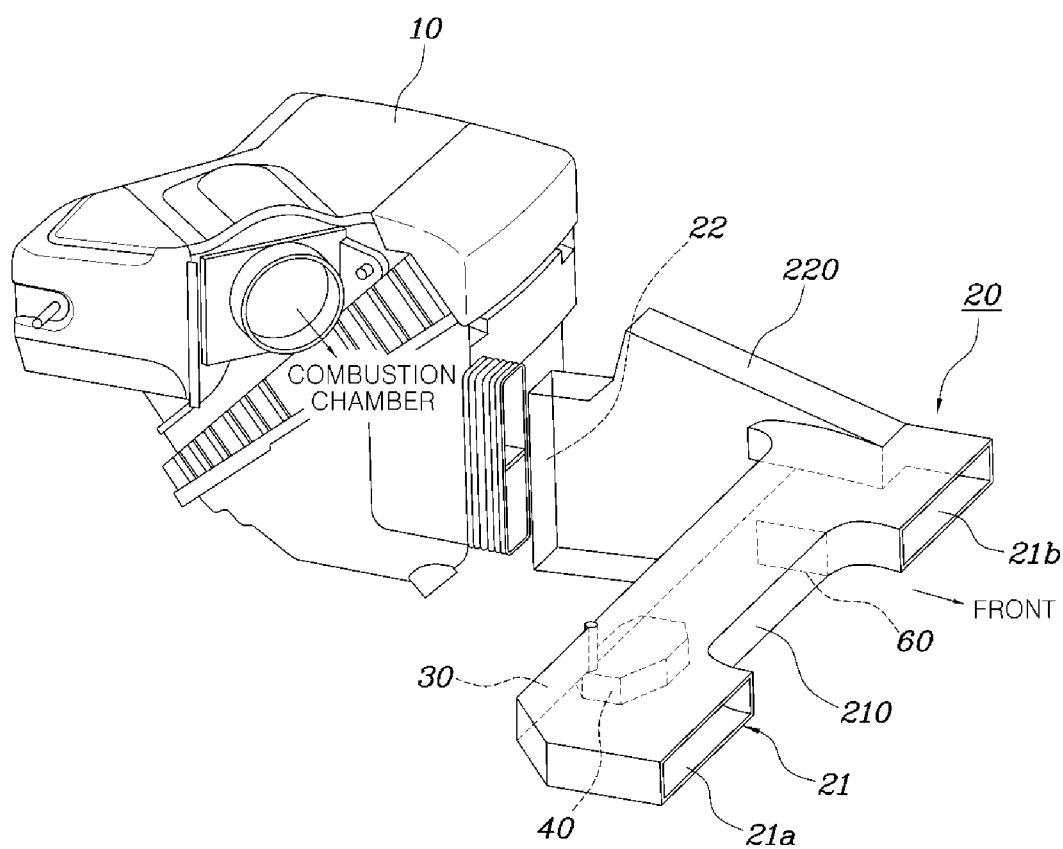
FIG. 1 is a diagram illustrating an air duct in which a duct flap is installed, according to an exemplary embodiment of the present invention.
Figure 2:
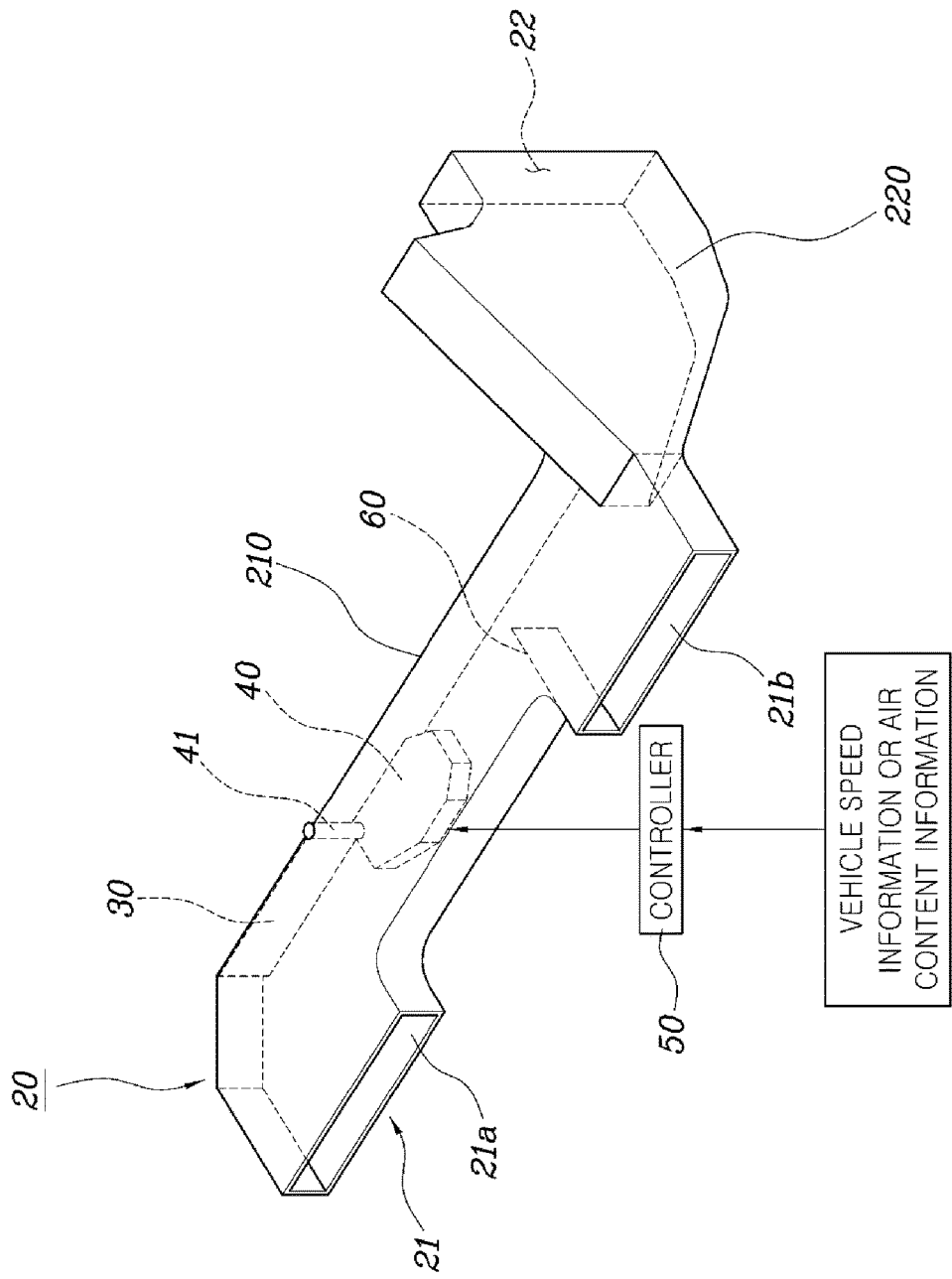
FIG. 2 is a perspective view of the air duct to which the duct flap is applied, according to the exemplary embodiment of the present invention.
Figure 3:
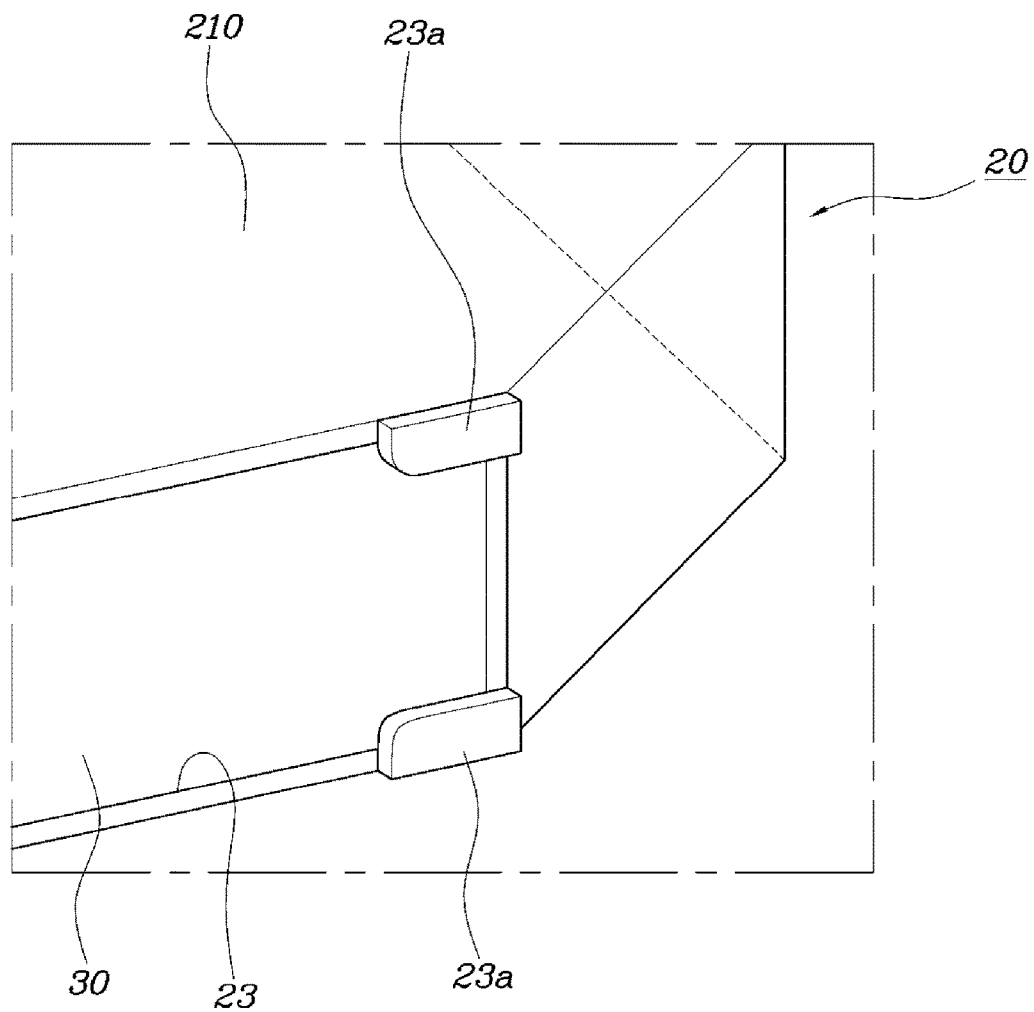
FIG. 3 and FIG. 4 are diagrams illustrating a state in which the duct flap is opened and closed, according to the exemplary embodiment of the present invention.
Figure 4:
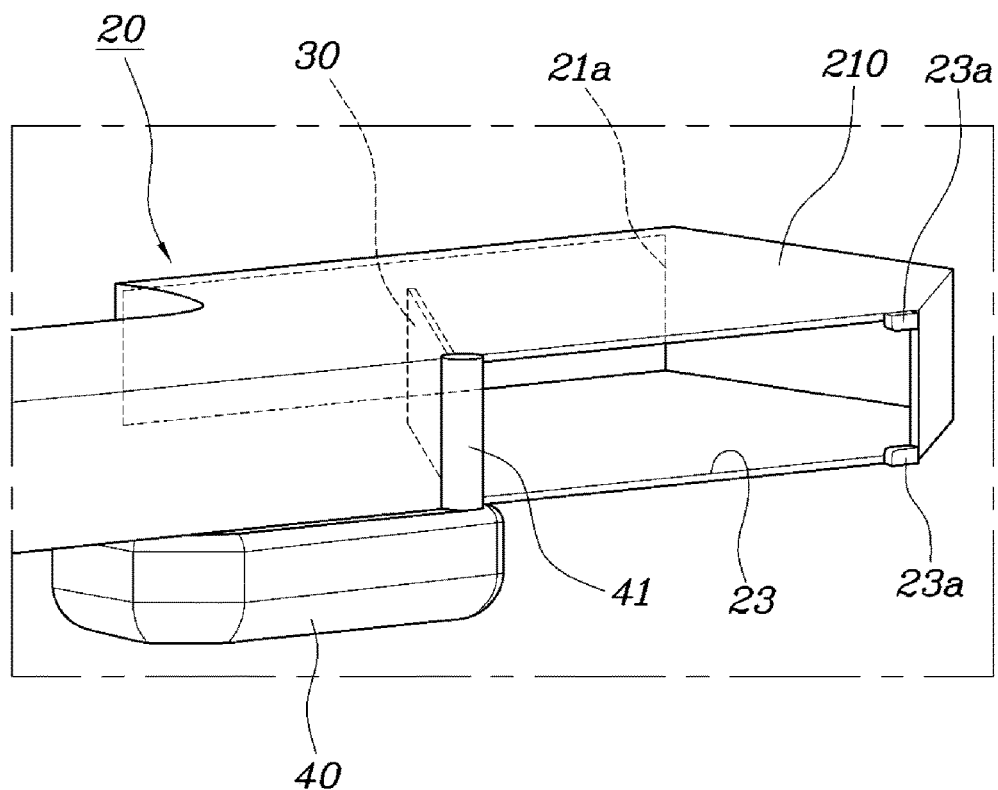

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an apparatus for improving cooling performance of an engine room in a vehicle according to exemplary embodiments of the present invention will be described with reference to the accompanying drawings.

An intake system of a vehicle is configured to include an air duct, an air cleaner, and an air hose.

The air duct is to suck fresh air from the outside while a vehicle is driving, the air cleaner serves to filter impurities (dust, moisture, etc.) included in the sucked fresh air using an element, reduce intake noise, and block flames at the time of a backfire to prevent wear of a cylinder and a piston, oil pollution, etc., and the air hose serves to supply the fresh air from which impurities are removed to a combustion chamber of an engine.

Meanwhile, as illustrated in FIGS. 1 to 6, the apparatus for improving cooling performance of an engine room according to the exemplary embodiment of the present invention includes: an air duct 20 connected to an air cleaner to serve as a moving guide of fresh air to be able to supply fresh air to an air cleaner 10, a duct flap 30 installed to open and close some section of the air duct 20 and operated to supply all the fresh air introduced into the air duct 20 when the air duct 20 is in a closed state to the air cleaner 10 and discharge some of the fresh air introduced into the air duct 20 when the air duct 20 is in an opened state to a space of a high temperature part of an engine room ER, and an actuator 40 supplying power to the duct flap 30 to perform an opening and closing operation of the duct flap 30.

The space of the high temperature part of the engine room ER becomes a space of a front side of the engine E in which an intake manifold IM or a turbocharger TC of the engine E is positioned.

The space of the front side of the engine E in which the intake manifold IM or the turbocharger TC is positioned is a space in which air heated after a radiator is cooled is temporarily stagnated. If the temperature of the engine room ER excessively rises or an intake port of the engine E is heated due to the heated air, such that fuel cell may be aggravated and an output may be reduced. Therefore, according to the exemplary embodiment of the present invention, some of the fresh air introduced into the air duct 20 is discharged to the space of the front side of the engine E which is the space of the high temperature part of the engine room ER when the duct flap 30 is opened to greatly reduce a temperature of the engine room ER and a temperature of the engine intake port, thereby improving the fuel efficiency and the output.

Further, the apparatus for improving cooling performance of an engine room according to the exemplary embodiment of the present invention further includes a controller 50 controlling an operation of the actuator 40, in which the controller 50 uses vehicle speed information or air content information introduced into the engine to control the operation of the actuator 40.

The vehicle speed information may use a signal detected by a vehicle speed sensor, a wheel sensor, a sensor of an accelerator pedal, etc.

The air content information may use a separately applied air content sensor to obtain information, in the case of a diesel engine and use a lambda sensor to obtain whether the air content is excessive or insufficient, in the case of a gasoline engine.

Further, the apparatus for improving cooling performance of an engine room according to the exemplary embodiment of the present invention further includes a screen panel 60 installed to partially screen a passage of the air duct 20 by being positioned within the air duct 20 and reduce noise of a specific frequency band by securing hardness of the air duct 20.

The noise of the intake system is sensitive to a length and a cross sectional area of the air duct 20, in particular, when the air duct 20 is made of a plastic material, noise occurs due to a vibration of the material itself. Therefore, according to the exemplary embodiment of the present invention, the screen panel 60 is installed in the air duct 20 to reduce the cross sectional area of the air duct 20 and secure hardness, thereby greatly reducing the noise of the specific frequency band (high frequency band).

The actuator 40 is fixedly installed at an outside of the air duct 20, the actuator 40 is coupled with a hinge axis 41 axially rotated by power of the actuator 40, the duct flap 30 is positioned inside the air duct 20 and has one end coupled with the hinge shaft 41 and the other end rotated to open and close some section of the air duct 20 when the hinge shaft 41 is rotated.

The air duct 20 includes an inlet 21 into which the fresh air is introduced, an outlet 22 connected to the air cleaner 10, and a middle discharge port 23 positioned between the inlet 21 and the outlet 22 to be opened and closed by the duct flap 20.

The middle discharge port 23 is rotatably provided with the duct flap 30 and thus is opened and closed by the rotation of the duct flap 30.

An edge portion of the middle discharge port 23 is provided with a plurality of stopper flanges 23a and when the middle discharge port 23 is closed by the duct flap 30, the stopper flange 23a contacts the duct flap 30 to prevent the duct flap 30 from excessively rotating, thereby improving sealability of the middle discharge port 23.

According to the exemplary embodiment of the present invention, the air duct 20 includes an inlet side duct 210 provided with the inlet 21 and the middle discharge port 23 and an outlet side duct 220 provided with the outlet 22 while being connected to the inlet side duct 210.

Further, the inlet 21 is configured to include a first inlet 21a and a second inlet 22a spaced apart from each other, in which the first and second inlets 21a and 21b are connected to each other by a connection passage, the middle discharge port 23 is formed at a position opposite to the first inlet 21a and is formed at a position opposite to the space of the front side of the engine E which is the space of the high temperature part of the engine room ER, and the outlet side duct 220 is connected to be opposite to the second inlet 21b.

Here, the first inlet 21a and the second inlet 22a has a difference in terms used to describe two inlets in different expressions and therefore any one inlet opposite to the middle discharge port 23 may be the second inlet and the other inlet opposite to the output side duct 220 may be the first inlet.

Meanwhile, the fresh air introduced into the first inlet 21a when the door flap 30 is opened may be discharged through the middle discharge port 23 as soon as possible. To this end, according to the exemplary embodiment of the present invention, the middle discharge port 23 may be formed at a position opposite to the first inlet 21a.

Further, the cold fresh air discharged through the middle discharge port 23 when the duct flap 30 is opened may be directly discharged to the space of the front side of the engine E which is the space of the high temperature part of the engine room ER. To this end, the middle discharge port 23 may be formed to be opposite to the space of the front side of the engine E.

According to the exemplary embodiment of the present invention, the screen panel 60 is configured to cut off some of the connection passage 24 at a position at which the second inlet 21b is connected to the connection passage 24.

That is, one end of the screen panel 60 is formed to be connected to the inlet side duct 210 at a position at which the second inlet 21b is connected to the connection passage 24 and the other end of the other side extends toward a rear portion at which the air cleaner 10 is present to cut off some of the connection passage 24. As a result, according to the exemplary embodiment of the present invention, due to the screen panel 60, the cross sectional area of the air duct 20 may be reduced and the hardness of the air duct 20 is increased, thereby greatly reducing the noise of the specific frequency band (high frequency band).

According to the exemplary embodiment of the present invention, the duct flap 30 is operated to open the middle discharge port 23 only when the vehicle is in an idle state or when a vehicle speed is in a low speed section (30 to 40 km/h or less) or a high speed section (80 to 90 km/h or more) and is operated to close the middle discharge port 23 when the vehicle speed is in a middle section (30 to 40 km/h to 80 to 90 km/h) or an acceleration section.

According to another exemplary embodiment of the present invention, the duct flap 30 is operated to open the middle discharge port 23 if the air content of the engine is in an excessive state and is operated to close the middle discharge port 23 if the air content of the engine is in an insufficient state or a proper state.

Further, when the duct flap 30 is operated to open the middle discharge port 23, the connection passage 24 is cut off by the duct flap 30. In this case, the fresh air introduced into the first inlet 21a is discharged to the middle discharge port 23, and at the same time the fresh air introduced into the second inlet 21b is supplied to the air cleaner 10 through the outlet 22.

Meanwhile, if the duct flap 30 is rotated to open the middle discharge port 23 and at the same time cut off the connection passage 24, the fresh air introduced into the first inlet 21a is cut off by the duct flap 30 to completely limit the movement toward the outlet 22 or move only very little fresh air toward the outlet 22.

Therefore, the air duct 20 may have a reduced length by the duct flap 30 which cuts off the connection passage 24, such that the noise of the specific frequency band (low frequency band) may be greatly reduced.

Hereinafter, an action and an effect of an exemplary embodiment of the present invention will be described.

Figure 5:
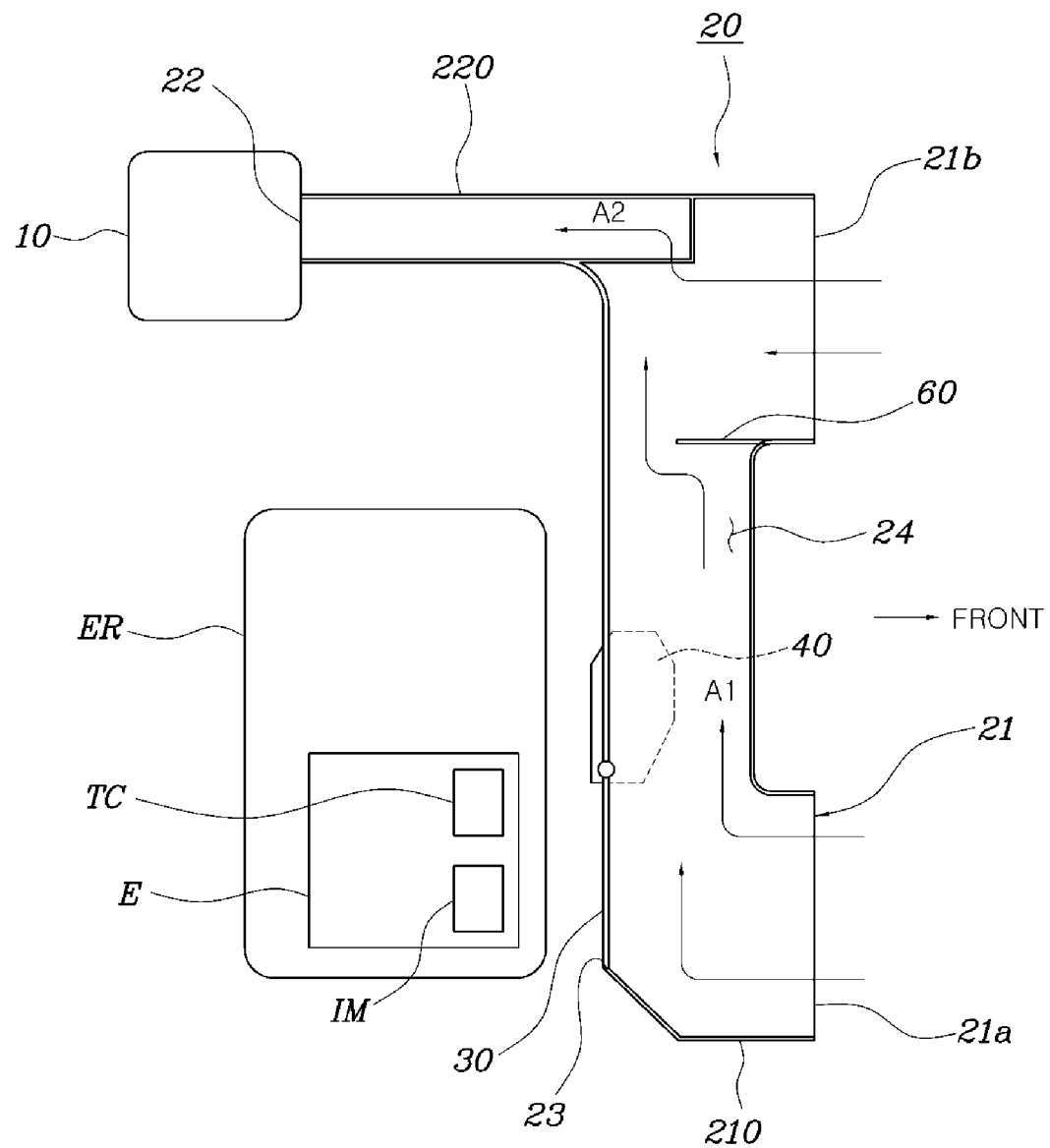
FIG. 5 and FIG. 6 are diagrams for describing a state in which fresh air moves when the duct flap is in the closed state and the opened state, according to the exemplary embodiment of the present invention.

FIG. 5 illustrates the case in which the middle discharge port 23 of the air duct 20 is sealed by the duct flap 30. In this case, both of fresh air (arrow A1) introduced through the first inlet 21a of the air duct 20 and fresh air (arrow A2) introduced through the second inlet 21b are supplied to the air cleaner 10 through the outlet 22.

When the vehicle speed is in the middle speed section or the acceleration section or the air content of the engine is in the insufficient state or the proper state, a large amount of fresh air is required in the engine E. In this case, the actuator 40 is operated by the control of the controller 50, such that as illustrated in FIG. 5, the middle discharge port 23 is sealed by the duct flap 30 and the fresh air introduced through all the inlets 21 of the air duct 20 is supplied to the air cleaner 10 through the outlet 22, thereby supplying a large amount of fresh air toward the engine E.

Meanwhile, when the fresh air introduced through the first inlet 21a moves to the outlet side duct 220 through the connection passage 24, according to the exemplary embodiment of the present invention, the screen panel 60 may reduce the cross sectional area of the air duct 20 and increase the hardness of the air duct 20, thereby greatly reducing the noise of the specific frequency band (high frequency band) according to the exemplary embodiment of the present invention.

Figure 6:
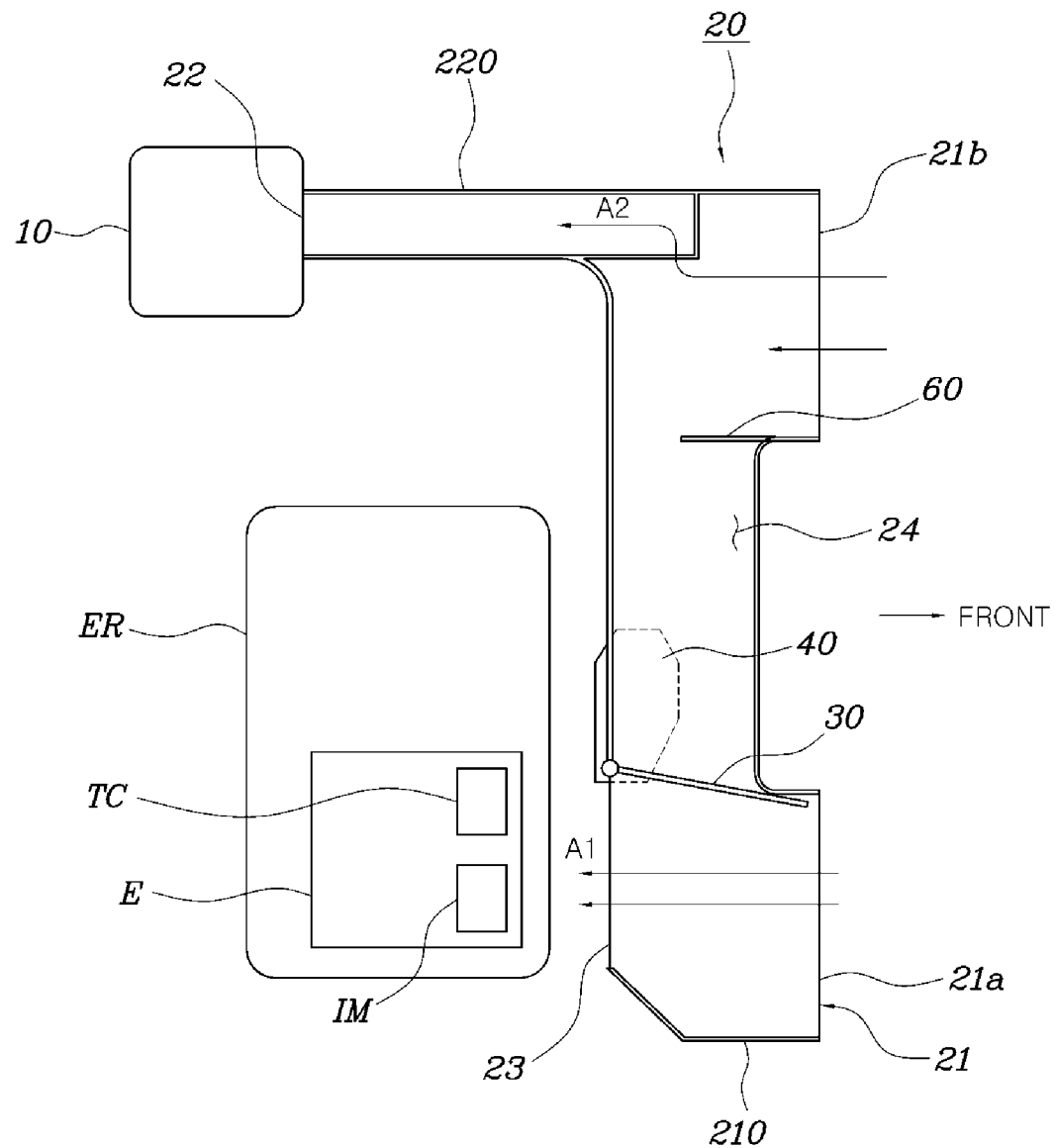

FIG. 6 illustrates that the middle discharge port 23 is opened by the rotation of the duct flap 30 and the connection passage 24 is cut off by the duct flap 30. In this case, the fresh air (arrow A1) introduced through the first inlet 21a of the air duct 20 is discharged to the space of the front side of the engine E which is the space of the high temperature part of the engine room ER through the middle discharge port 23 and the fresh air (arrow A2) introduced through the second inlet 21b is introduced into the outlet side duct 220 and then is supplied to the air cleaner 10 through the outlet 22.

The temperature of the engine room ER is reduced and the temperature of the engine intake port is reduced by the cold fresh air (arrow A1) discharged to the space of the front side of the engine E in which the intake manifold M or the turbocharger TC is positioned through the middle discharge port 23, thereby improving the fuel efficiency and improving the output.

The amount of fresh air required in the engine is small when the vehicle is in the idle state, the vehicle speed is in the low speed section, or the air content of the engine is in an excessive state and the fresh air is introduced into the second inlet 21a side fast when the vehicle speed is in the high speed section, such that the effect of the fresh air introduced through the first inlet 21a is relatively insignificant, compared to the second inlet 21a side. In this case, only the fresh air introduced through the second inlet 21b may be supplied to the air cleaner 10 through the outlet 22.

Meanwhile, if due to the operation of the actuator 40 by the control of the controller 50, the duct flap 30 is rotated to open the middle discharge port 23 and at the same time cut off the connection passage 24 as illustrated in FIG. 6, the fresh air introduced into the first inlet 21a is discharged to the middle discharge port 23 and at the same time the fresh air introduced into the second inlet 21b is introduced into the outlet side duct 220 and then is supplied to the air cleaner 10 through the outlet 22, such that the air duct 20 may have the reduced length, thereby greatly reducing the noise of the specific frequency band (low frequency band).

According to the exemplary embodiments of the present invention, it is possible to discharge some of the fresh air introduced into the air duct while the vehicle is driving to the space of the front side of the engine in which the intake manifold or the turbocharger is positioned to greatly reduce the space temperature of the high temperature part of the engine room and the temperature of the engine intake port, thereby improving the fuel efficiency and the output.

Further, it is possible to reduce the noise of the specific frequency band occurring while the fresh air passes through the air duct to greatly reduce the noise of the intake system.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for improving cooling performance of an engine room in a vehicle, comprising:
   an air duct connected to an air cleaner to serve as a moving guide of fresh air and including a middle discharge port fluidically connected to the engine room;
   a duct flap configured to open or close the middle charge port; and
   an actuator supplying power to the duct flap to perform an opening and closing operation of the duct flap,
   wherein, when the duct flap closes the middle discharge port, all of the fresh air introduced into the air duct is supplied to the air cleaner, and
   when the duct flap opens the middle discharge port, a portion of the fresh air introduced into the air duct is supplied toward a space of a high temperature part of the engine room through the middle discharge port.

2. The apparatus of claim 1, wherein the space of the high temperature part of the engine room t is a space of a front side of an engine in which an intake manifold or a turbocharger of the engine is positioned.

3. The apparatus of claim 1, further comprising:
   a controller controlling an operation of the actuator,
   wherein the controller controls the operation of the actuator using vehicle speed information.

4. The apparatus of claim 1, further comprising:
   a controller controlling an operation of the actuator,
   wherein the controller controls the operation of the actuator using air content information introduced into the engine.

5. The apparatus of claim 1, further comprising:
   a screen panel installed to partially screen a passage of the air duct by being positioned within the air duct and reduce noise of a predetermined frequency band by securing hardness of the air duct.

6. The apparatus of claim 5, wherein the actuator is fixedly installed at an outside of the air duct,
   the actuator is coupled with a hinge shaft axially rotated by power of the actuator, and
   the duct flap is positioned inside the air duct and has a first end coupled with the hinge shaft and a second end rotated to open and close a section of the air duct when the hinge shaft is rotated.

7. The apparatus of claim 6, wherein the air duct includes:
   an inlet into which the fresh air is introduced;
   an outlet connected to the air cleaner; and
   the middle discharge port positioned between the inlet and the outlet to be opened and closed by the duct flap.

8. The apparatus of claim 7, wherein an edge portion of the middle discharge port is provided with a plurality of stopper flanges, and
   the stopper flanges contact the duct flap when the middle discharge port is closed by the duct flap to prevent the duct flap from excessively rotating.

9. The apparatus of claim 7, wherein the air duct includes:
   an inlet side duct provided with the inlet and the middle discharge port; and
   an outlet side duct provided with the outlet while being connected to the inlet side duct.

10. The apparatus of claim 9, wherein the inlet includes a first inlet and a second inlet spaced apart from each other, the first and second inlets are connected to each other by a connection passage, the middle discharge port is formed at a position opposite to the first inlet and is formed at a position opposite to the space of the front side of the engine which is the space of the high temperature part of the engine room, wherein the duct flap selectively opens the connection passage, and the outlet side duct is connected to the second inlet to be opposite thereto.

11. The apparatus of claim 10, wherein the screen panel is installed to cut off a portion of the connection passage at a position at which the second inlet is connected to the connection passage.

12. The apparatus of claim 10, wherein the duct flap is operated to open the middle discharge portion only when the vehicle is in an idle state or when a vehicle speed is in a low speed section or a high speed section and close the middle discharge port when the vehicle speed is in a middle section or an acceleration section, the connection passage is cut off by the duct flap when the duct flap is operated to open the middle discharge port, and when the connection passage is cut off by the duct flap, the fresh air introduced into the first inlet is discharged to the middle discharge port, and at a same time the fresh air introduced into the second inlet is supplied to the air cleaner through the outlet.

* * * * *